Aug. 14, 1934.  C. J. HALBORG  1,969,977
METHOD OF BROACHING AND BROACH THEREFOR
Filed Sept. 22, 1930
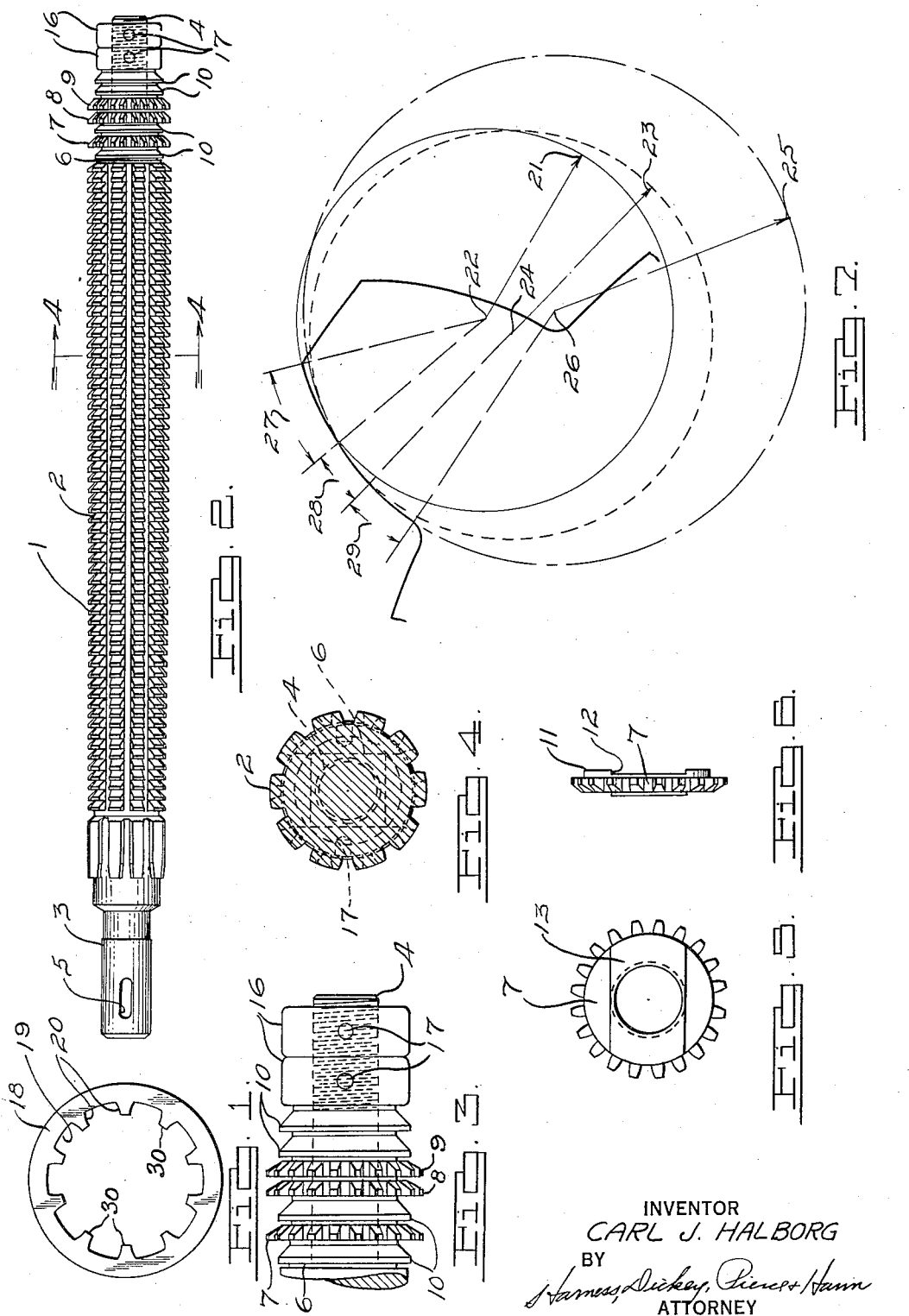
INVENTOR
*CARL J. HALBORG*
BY
ATTORNEY Patented Aug. 14, 1934

1,969,977

UNITED STATES PATENT OFFICE 1,969,977

METHOD OF BROACHING AND BROACH THEREFOR

Carl J. Halborg, Detroit, Mich., assignor to Colonial Broach Company, a corporation of Michigan Application September 22, 1930, Serial No. 483,492

14 Claims. (Cl. 90—33)

This invention relates to an improved broach, particularly of the type used in forming internal teeth on clutch members.

The main objects of the invention are to provide a broach which has a rough cutting portion throughout the main part of its length and replaceable finishing cutting elements on the remaining portions; to provide cutting teeth on the rough cutting portions of the broach which are substantially equal in width to the combined widths of several whole teeth of the finishing cutting elements; to provide cutting edges on the sides of the teeth of the rough and finishing cutting elements of the broach; to provide a shank on the broach for supporting the replaceable cutting elements which is adapted to hold the latter against rotation and to retain the cutting edges of the wide teeth of the rough cutting part of the broach substantially in alignment with the respectively opposite cutting edge of the spaced teeth of the finishing cutting elements with which the wide teeth register; to provide a shank of this kind on which the replaceable cutting elements may be selectively arranged so as to bring either of the opposite cutting edges of their teeth into alignment with the side cutting edges of the teeth of the rough cutting part of the broach, for allowing the side edges of the finishing teeth to be alternatively used; and to provide replaceable finishing cutting elements of this kind which have alternatively available cutting edges so that when one set of cutting edges becomes dulled the other set may be conveniently placed in operation.

Further objects of the invention are to provide a series of finishing cutting elements on a broach which form recesses in the work having sides that correspond in curvature to the sides of involute teeth; and to provide a series of adjacent cutters on a broach having teeth on which are formed true arcuate side faces that have a combined cutting effect which is equivalent to that of a single cutter having teeth on which sides faces of involute curvatures are formed.

An illustrative embodiment of my invention is shown in the accompanying drawing, in which:

Fig. 1 is a side elevation of a clutch element of the type which my improved broach is adapted to form.

Fig. 2 is a side elevation of a broach embodying the invention.

Fig. 3 is a fragmentary enlarged side elevation of a broach having finishing cutters of improved construction.

Fig. 4 is a vertical transverse section taken on the line 4—4 of Fig. 2.

Fig. 5 is a plan view of a finishing cutter showing the tongued side thereof.

Fig. 6 is a side elevation of a cutter showing a tongue receiving groove thereof.

Fig. 7 is a diagrammatic illustration showing the geometric development of the teeth of successive finishing cutters in superimposed relation.

In the form shown, my improved broach includes a tapered intermediate section 1 on which aligned series of rough cutting teeth 2 having sides of circular curvature, conforming approximately to the ultimate shape to be cut, are formed. This section is provided with stems 3 and 4 on its respective opposite ends. Formed on the stem 3 is a slot 5 by which the broach is attached to a ram of a broaching machine, not shown.

A shallow squared portion or shoulder 6 is formed in the broach immediately rearwardly of the last series of cutting teeth on the main body portion and the cylindrical stem 4 extends outwardly in alignment with the axis of the broach from this shoulder. The stem is adapted to receive thereon a plurality of toothed finishing cutters 7, 8 and 9 adapted to broach the involute opposite side of the adjacent teeth on the clutch member. A plurality of circular cutters 10 are also adapted to be received by the stem 4. These cutters have continuous circular peripheries and are of such diameter that their continuous cutting edges will remove the metal exposed between adjacent cutting teeth on the cutters 7, 8 and 9 and broach the inner crests of the inner clutch teeth.

Each of the toothed cutters 7, 8 and 9, as shown in elevation in Fig. 6, has a hub portion 11 in which a groove 12 is formed for receiving a tongue 13 on the next adjacent cutter as shown in Fig. 5. The cutters 10 are similarly provided with tongues and grooves. The cutters 7, 8 and 9 and the cutters 10 are interchangeable and may be arranged in any desired manner on the stem 4 with the groove on the cutter adjacent the shoulder 6 fitting over the same. In Fig. 3 a cutter 10 is shown as having the groove fitted over the shoulder 6 and as being fitted to a cutter 7 on its rear side, which cutter 7 is in turn fitted to a second cutter 10. Following this latter cutter are a pair of cutters 7, properly connected by tongue and groove connectors and these two latter cutters are followed by two of the cutters 10. All of the cutters 7, 8 and 9 and the cutters 10 are held in their locked position against displacement by a pair of lock nuts 16 threaded on the stem 4 and locked in place by pins.

In performing the finishing broaching operation remote edges of adjacent cutting teeth are employed for cutting opposed edges on adjacent teeth on the clutch member. The cutters 7, 8 and 9 are so designed that by reversal of their positions on the shank 4 ninety degrees, the formerly inoperative cutting edges become operative upon the clutch member to broach the same. By this feature economy due to longer life of the cutters is effected.

The broach illustrated is particularly adapted for forming, in the inner peripheries of clutch elements 18, grooves 19 of the type which receive a pair of involute clutch teeth. The side walls 20 of such grooves must conform in curvature with the curvature of the teeth which the grooves are to receive. Where such curvature is of involute form and where proper equipment is available to grind the teeth of the cutters 7, 8 and 9 to conform accurately to such curvature, this is preferably done, in which case the corresponding teeth on the various cutters are simply aligned with each other and with the teeth on the main body portion of the broach.

Where no equipment is available for forming the sides of the teeth to correct involute form, then by a further feature of the present invention, the teeth may be formed to so co-operate with one another to collectively form the desired curvature in the finished work. Thus in order to form the side walls 20 of the grooves in a broaching operation and without employing cutting teeth of involute shape, which are both difficult and expensive to grind, the successive cutters 7, 8 and 9 are provided with teeth having sides of circular curvatures which are formed in accordance with the development shown in Fig. 7. These cutters have equal pitch circles and the sides of the teeth of the first finishing cutter 7 have a circular curvature which corresponds with the curvature of the circle 21 having its center at 22. The curvature of the sides of the teeth of the second cutter 8 corresponds with the curvature of the circle 23 having its center at 24 and the curvature of the sides of the teeth of the third cutter 9 corresponds with the curvature of the circle 25 having its center at 26. The centers of the circles are suitably located and their diameters are such that successively adjacent arcs 27, 28 and 29 of the circles 21, 23 and 25 respectively, substantially lie on an arc of involute curvature. Thus the composite projection of the sides of corresponding teeth, shown in Fig. 7, has an involute curvature.

In operation the broach is drawn through a ring shaped blank in a conventional manner with the tapered end passing through the blank first. The aligned series of rough cutting teeth 2 gouge, or rough out slots in the inner periphery of the blank. As these teeth have side edges of circular curvature they form the side walls of the grooves to a corresponding curvature. Upon further movement of the broach the teeth of the first finishing cutter 7 come into operation and form the innermost portions of the side walls to the curvature of the arc 27. Still further movement of the broach successively brings the finishing cutters 8 and 9 into operation. The teeth of the finishing cutter 8 shapes the intermediate portions of the side walls 20 of the grooves to the curvature of the arc 28 and the teeth of the finishing cutter 9 shape the outer portions of the side walls to the curvature of the arc 29. The composite projection of these arcs lies substantially on the involute curve illustrated in Fig. 7. The continuous edged cutters 10 vary slightly in diameter, the foremost cutters being smaller, and they are adapted to trim the inner periphery of the blank 18 so as to properly shape the ends of the projections 30 which are located between the grooves 19.

The rough cutting teeth 2 of the tapered portion of the broach are twice as wide as the teeth of the finishing cutters and thus one aligned series of rough cutting teeth 2 corresponds with a pair of teeth of each finishing cutter. The teeth of the rough cutting portion of the broach may be as wide as any desired number of teeth of the finishing cutters, the proportions shown being for purposes of illustration only.

Since one aligned series of the rough cutting teeth 2 register with two or more teeth of the finishing cutters, only the outer sides of each pair of finishing teeth are exposed during a single setting of the finishing cutters. When the exposed sides of the teeth of the finishing cutters become dulled by use, the cutters may be removed from the square portion 6 of the stem 4 and replaced in a different angular relation thereto so as to bring the sides of the finishing teeth which were previously out of registration with the sides of the rough cutting teeth 2 into an exposed, operative position. With the construction shown, a rotation of 90 degrees will accomplish this result. In this manner finishing teeth having true circular curvatures which are inexpensively formed may be used for forming grooves having side walls of involute curvatures and both sides of the finishing teeth may be alternatively employed.

Although but one specific embodiment of this invention has been herein shown and described, it will be understood that numerous details of the construction shown may be altered or omitted without departing from the spirit of this invention as defined by the following claims.

What I claim is:

1. A broach including a section having series of aligned rough cutting teeth, and a finishing cutter co-axial with said section and detachably mounted on one extremity thereof having a pair of finishing teeth in registration with each aligned series of rough cutting teeth, said section and cutter being convenable in alternative angular positions for operative broaching action.

2. A broach including a section having series of aligned rough cutting teeth, and a finishing cutter detachably mounted on one extremity of said section having a pair of finishing teeth in registration with each aligned series of rough cutting teeth, said section and cutter being convenable in one angular relation for placing selected side edges of said finishing teeth in registration with the side edges of said rough cutting teeth and in another angular relation for placing other side edges of said finishing teeth in registration with the side edges of said rough cutting teeth.

3. A broach including a section having series of aligned rough cutting teeth, and a finishing cutter at one extremity of said section having two finishing teeth in registration with each aligned series of rough cutting teeth, said cutter being angularly adjustable with respect to said section for bringing selected side edges of the finishing teeth into registration with the side faces of said rough cutting teeth.

4. A broach including a section having series of aligned rough cutting teeth, a support on said broach at one extremity of said section, and a finishing cutter detachably mounted on said support having a pair of teeth in registration with each aligned series of rough cutting teeth, said support and cutter being convenable in alternative right angular positions for permitting one set of side edges of the finishing teeth to be exposed to the work until they are dulled and to allow another set to be exposed thereafter.

5. A broach including a tapered section having aligned rough cutting teeth, adapted to rough out spaced grooves in the inner periphery of a piece of work, a shank on said section, a finishing cutter detachably mounted on said shank having a set of finishing teeth in registration with each aligned series of rough cutting teeth, cutting edges on the sides of said finishing teeth for trimming the sides of said grooves, said shank being adapted to alternatively retain said cutter in predetermined angular positions relative to said section for alternatively placing both cutting edges of said finishing teeth in an operative position, and means for clamping said cutter on said broach.

6. A broach including a tapered section having rough cutting teeth for roughing out spaced grooves in the inner periphery of a piece of work, a replaceable finishing cutter detachably mounted on the large end of said tapered section having finishing teeth for trimming the rough cut sides of said grooves, and a detachable cutting member adjacent the finishing cutter having a continuous peripheral cutting edge for trimming the inner periphery of said work between said grooves.

7. A broach including a tapered section having rough cutting teeth for roughing out spaced grooves in the inner periphery of a piece of work, a pair of replaceable cutters detachably mounted on the large end of said tapered section and having finishing teeth for trimming the rough cut sides of said grooves, and a pair of cutters each having a continuous cutting edge for trimming the inner periphery of said work between said grooves, one of said last mentioned cutters being located on each side of one of said finishing cutters.

8. A broach including a tapered section having rough cutting teeth for roughing out grooves in a piece of work, a shank formed on one end of said tapered section, there being a squared shoulder at the base of said shank, a finishing cutter having cutting teeth for finishing the sides of the grooves formed by the rough cutting teeth, said finishing cutter having a transverse groove formed therein adapted to be received over said squared shoulder with its sides in contact with either of the two pairs of sides of the squared shoulder, the teeth on said finishing cutter being so formed that upon positioning of said finishing cutter on the shoulder, remote sides of adjacent cutting teeth will engage opposed edges of the grooves in the work to finish the same and upon positioning the finishing cutter at right angles to said first mentioned position, shifting of the teeth on said finishing cutter will occur whereby the previously inoperative edges will be caused to engage opposed sides of the grooves of the work to finish the same.

9. A broach including a section having a series of aligned rough cutting teeth, a plurality of separable finishing cutters detachably mounted on one extremity of said section and having a plurality of finishing teeth, the opposite edges of each pair of adjacent finishing teeth being substantially aligned with opposite edges of individual teeth on the rough cutting section to trim the surfaces roughed out by the rough cutting teeth and means formed on said cutters and cooperating with the rough cutting section for maintaining such alignment.

10. In a broach, a series of adjacent cutters each including a tooth having a side cutting edge of circular curvature, the teeth of the cutters at the extremities of said series having portions of their side cutting edges protruding beyond the side cutting edges of the other teeth at the inner and outermost parts of said teeth respectively, and an intermediate tooth of said series having a side cutting edge portion protruding beyond the other teeth between the respective inner and outer protruding portions thereof, the combined cutting effect of said teeth being substantially equivalent to that of a tooth having involute shaped side edges.

11. In a broach, a plurality of cutters each including teeth having arcuate side edges, corresponding teeth on successive cutters having their side edges in overlapping relation so disposed that the aggregate cuts effected by the side edges of corresponding teeth of said cutters produce an involute curvature.

12. The method of broaching involute side walls in a groove which includes the steps of roughing out slots in a piece of work, of forming arcuate cuts in the inner portions of the side walls of said grooves, of forming arcuate cuts in the intermediate portion of the side walls of said grooves, having curvatures of a different radius and center from the first of said cuts, and of forming arcuate cuts in the other portions of the side walls of said slots having circular curvatures of still different radius and center, the overlapping cuts substantially forming an involute curvature.

13. In a broach, a row of aligned teeth, the sides of which are of arcuate shape struck from different radii to have portions of the teeth disposed outwardly of portions of other of the teeth, the successive cuts of said teeth overlapping to form a convolution which is substantially involute in form.

14. A broach including a tapered section having rough cutting teeth for roughing out a groove in a piece of work, a plurality of cutters each including teeth having sides of arcuate curvature for trimming the sides of said groove, the sides of said teeth being in overlapping relation so that the aggregate of the successive arcuate cuts shape the sides of the groove in a predetermined curvature.

CARL J. HALBORG.